United States Patent
Sugahara et al.

(10) Patent No.: US 9,566,733 B2
(45) Date of Patent: Feb. 14, 2017

(54) INJECTION MOLDING MACHINE

(71) Applicant: FANUC Corporation, Yamanashi (JP)

(72) Inventors: Keisuke Sugahara, Yamanashi (JP); Koichi Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/846,202

(22) Filed: Sep. 4, 2015

(65) Prior Publication Data

US 2016/0075066 A1 Mar. 17, 2016

(30) Foreign Application Priority Data

Sep. 11, 2014 (JP) .................................. 2014-185281

(51) Int. Cl.
*B29C 45/64* (2006.01)
*B29C 45/17* (2006.01)

(52) U.S. Cl.
CPC .................................. *B29C 45/1761* (2013.01)

(58) Field of Classification Search
CPC .................................................. B29C 45/1761
USPC .......... 425/190, 192 R, 589, 593, 595, 451.9
See application file for complete search history.

(56) References Cited

U.S. PATENT DOCUMENTS

| | | | |
|---|---|---|---|
| 3,720,492 A * | 3/1973 | Hehl | B29C 45/4005 425/188 |
| 4,564,348 A | 1/1986 | Hehl | |
| 6,517,337 B1 * | 2/2003 | Hehl | B29C 45/07 425/190 |
| 6,872,066 B2 * | 3/2005 | Wernz | B29C 45/6714 425/595 |
| 2009/0291162 A1 | 11/2009 | Wenzin et al. | |
| 2013/0287885 A1 | 10/2013 | Schad | |
| 2015/0104538 A1 | 4/2015 | Sugahara | |

FOREIGN PATENT DOCUMENTS

| | | |
|---|---|---|
| JP | 45-5789 Y1 | 3/1970 |
| JP | 58-92543 A | 6/1983 |
| JP | 5-192956 A | 8/1993 |
| JP | 5-278071 A | 10/1993 |
| JP | 2000-84979 A | 3/2000 |
| JP | 2000-289069 A | 10/2000 |
| JP | 2006-297865 A | 11/2006 |
| JP | 2009-137229 A | 6/2009 |
| JP | 2010-12720 A | 1/2010 |
| JP | 2014-61655 A | 4/2014 |
| JP | 2014-213583 A | 11/2014 |
| JP | 2015-77715 A | 4/2015 |

OTHER PUBLICATIONS

Office Action in JP Application No. 2014-185281 dated Nov. 17, 2015.

* cited by examiner

*Primary Examiner* — Joseph S. Del Sole
*Assistant Examiner* — Thukhanh T Nguyen
(74) *Attorney, Agent, or Firm* — Hauptman Ham, LLP

(57) ABSTRACT

A machine base of an injection molding machine on which a mold clamping mechanism and an injection mechanism are mounted includes a plurality of struts. At least one of these struts are constituted by arranging and coupling two members (strut elements) each formed by bending a metal plate and having a C cross section, thereby providing a structure to withstand vibrations of the mold clamping mechanism and the like mounted on the machine base.

3 Claims, 3 Drawing Sheets

INJECTION MOLDING MACHINE

RELATED APPLICATIONS

The present application claims priority to Japanese Application Number 2014-185281, filed Sep. 11, 2014, the disclosure of which is hereby incorporated by reference herein in its entirety.

BACKGROUND OF THE INVENTION

1. Field of the Invention

The present invention relates to a structure of an injection molding machine in which a mold clamping mechanism and an injection mechanism are mounted on a machine base.

2. Description of the Related Art

An example of the structure of a conventional injection molding machine will be described using FIG. 5.

The injection molding machine includes a mold clamping apparatus 1 that generates a mold clamping force by opening and closing a mold, an injection apparatus 2 arranged opposite to the mold clamping apparatus 1 to melt and inject a resin into the mold, and a machine base 3 on which the mold clamping apparatus 1 and the injection apparatus 2 are mounted.

The machine base 3 includes a machine base top surface portion 4, a machine base undersurface portion 5, and a strut 6, and as shown in FIG. 5, the mold clamping apparatus 1 and the injection apparatus 2 are placed on the machine base top surface portion 4 of the machine base 3. The machine base undersurface portion 5 is arranged so as to be parallel to the machine base top surface portion 4 and the strut 6 couples the machine base top surface portion 4 and the machine base undersurface portion 5. The strut 6 is arranged at least on the four corners of the machine base 3 and the material such as C-section steel, H-section steel, and square pipe steel is commonly used.

A technology by which a machine base of an injection molding machine is configured by using a plate member and the body of the injection molding machine is mounted on the machine base is disclosed by JP 2000-84979 A and JP 2014-61655 A, for example.

The mold opening/closing speed may be increased to improve productivity of an injection molding machine. In such a case, the strut 6 may be deformed under the influence of an acceleration and deceleration operation of a mechanism unit such as the mold clamping apparatus 1 and the injection apparatus 2, leading to increased vibration of the whole injection molding machine. To prevent such vibration, a method of making the strut thicker may be applied, but in such a case, the weight of the machine base 3 increases and an additional cost may be invited.

Even when a plate member is used for the machine base as disclosed by JP 2000-84979 A or JP 2014-61655 A described above, the plate member may be bent under the influence of an acceleration and deceleration operation of the mechanism unit, leading to increased vibration of the whole injection molding machine. To prevent such vibration, a method of making the plate member thicker may be applied, but in such a case, an additional cost may be invited.

SUMMARY OF THE INVENTION

An object of the present invention is to provide an injection molding machine capable of improving a vibration suppression effect by reducing deformation or bending of the struts and the like of the injection molding machine in a simple structure.

An injection molding machine according to the present invention includes a mold clamping mechanism configured to generate a mold clamping force by opening and closing a mold, an injection mechanism arranged opposite to the mold clamping mechanism and configured to melt and inject a resin into the mold, and a machine base on which the mold clamping mechanism and the injection mechanism are mounted. The machine base includes a plurality of struts and at least one of the struts is constituted by arranging and coupling a plurality of members formed in an approximately C shape in plane view.

In the present invention, when compared with a case in which a machine base is configured by using a columnar strut or a plate member, a vibration suppression effect can be improved by configuring the strut by arranging and coupling a plurality of members formed in an approximately C shape in plane view.

The struts can be arranged on a side of the mold clamping mechanism. In general, more vibration is generated in the mold clamping mechanism than in the injection mechanism in the mechanism units and thus, the vibration suppression effect can further be improved by the struts being arranged on the side of the mold clamping mechanism where more vibration is likely to be generated.

A through hole may be provided in at least one of the members constituting the strut and formed in the approximately C shape. By providing the through hole for machine base lifting, which is conventionally provided in another member for machine base lifting, in at least one of the members constituting the strut and formed in the approximately C shape, the member for machine base lifting can be eliminated so that the machine base can achieve weight reduction. According to the present invention, an injection molding machine capable of improving a vibration suppression effect by reducing deformation or bending of the struts and the like of the injection molding machine in a simple structure can be provided.

BRIEF DESCRIPTION OF THE DRAWINGS

The above object and other objects and features of the present invention will be apparent from the description of embodiments below with reference to appended drawings. Among these diagrams.

DETAILED DESCRIPTION OF THE PREFERRED EMBODIMENTS

Figure 1:
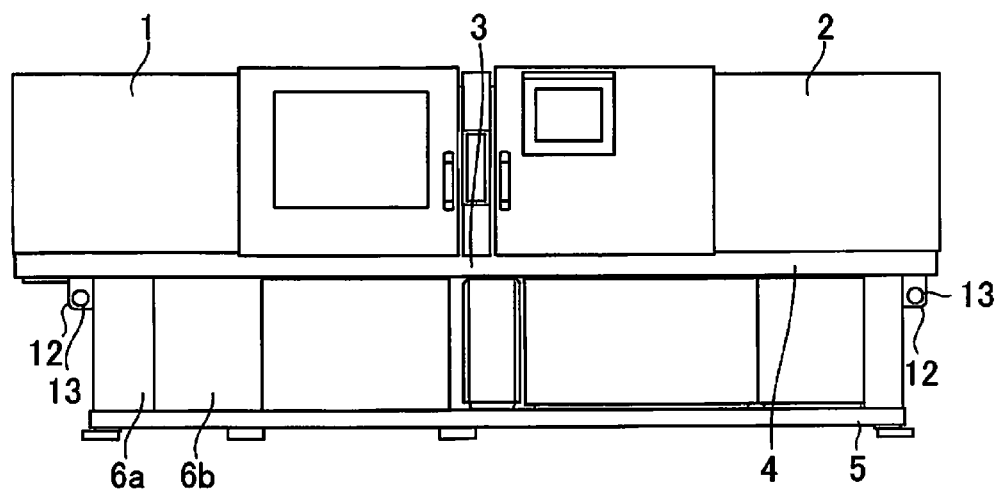
FIG. 1 is a front view showing a structure of a first embodiment of an injection molding machine according to the present invention.

The embodiments of the present invention will be described below with reference to the drawings. The same reference numerals are attached to configurations similar to those of conventional technology and the description thereof is omitted.

First, the first embodiment of an injection molding machine according to the present invention will be described with reference to FIGS. 1 to 3.

FIG. 1 is a diagram illustrating a structure of the first embodiment of an injection molding machine according to the present invention. The embodiment is characterized in that a strut 6 is configured by coupling a first strut element 6a and a second strut element 6b. Details of the shape of the strut 6 will be described later. Also in FIG. 1, a through hole is provided in a machine base 3 so that the machine base 3 can be lifted by inserting a rod-like machine base lifting member 12 into the through hole.

Figure 2A:
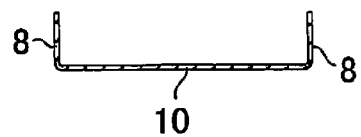
FIGS. 2A to 2C are diagrams illustrating examples in which a strut constituting a machine base of the injection molding machine in FIG. 1 is formed of a first strut portion and a second strut portion.
Figure 2B:
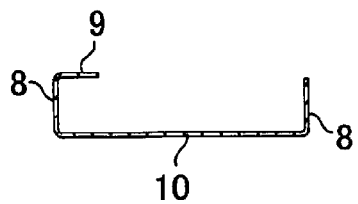
Figure 2C:
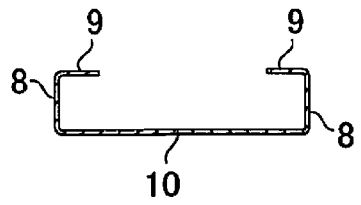

FIGS. 2A to 2C are diagrams illustrating examples in which strut elements are formed from metal plate members when the strut constituting the machine base of the injection molding machine in FIG. 1 is formed from the two strut elements, the first strut element 6a and the second strut element 6b.

In a first strut element formation example shown in FIG. 2A, a first bent portion 8 is formed by bending inward each of both left and right ends of a flat portion 10 of the metal plate member. The first bent portion 8 is bent so as to be at approximately right angles with respect to the flat portion 10. The strut element formed in this manner has an approximately C shape in plane view.

In a second strut element formation example shown in FIG. 2B, the first bent portion 8 is formed by bending inward each of both left and right ends of the flat portion 10 of the metal plate member, and a second bent portion 9 is formed so as to be at approximately right angles with respect to the first bent portion 8 by further bending either the left or right ends of the first bent portion 8. The second bent portion 9 is configured to be approximately parallel to the flat portion 10. The strut element formed in this manner has an approximately C shape in plane view.

In a third strut element formation example shown in FIG. 2C, the first bent portion 8 is formed by bending both left and right ends of the flat portion 10 of the metal plate member, and the second bent portion 9 is formed so as to be at approximately right angles with respect to the first bent portion 8 by bending each of the ends of the first bent portion 8. Each of the second bent portions 9 is configured to be approximately parallel to the flat portion 10. The strut element formed in this manner has an approximately C shape in plane view.

As illustrated in FIGS. 2A to 2C, the strut element formed in an approximately C shape in plane view has, as described above, the flat portion 10 and bent portions (the first bent portions 8 or the first and second bent portions 8, 9) bent at least once on both ends of the flat portion.

Figure 3A:
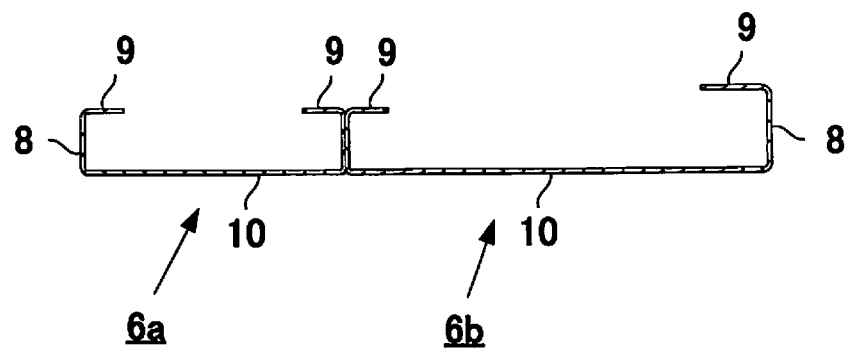
FIGS. 3A and 3B are diagrams illustrating examples in which the strut constituting the machine base of the injection molding machine is formed by coupling two strut elements configured in any shape in FIGS. 2A to 2C.
Figure 3B:
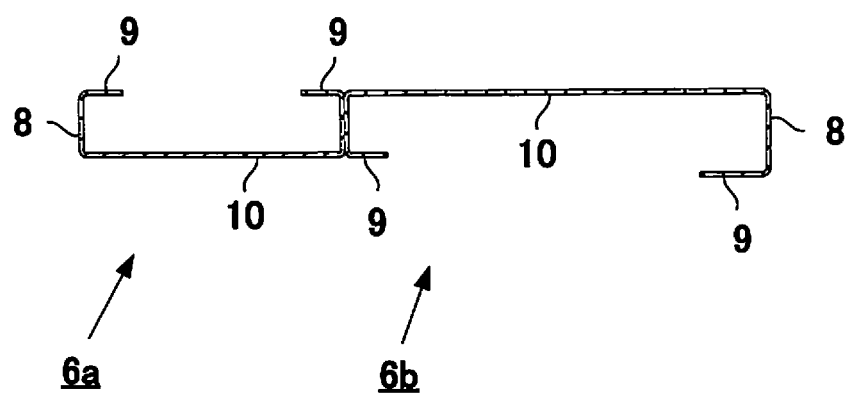

FIGS. 3A and 3B each show examples in which the strut 6 constituting the machine base 3 of the injection molding machine is formed by coupling two strut elements configured in any shape in FIGS. 2A to 2C.

The strut formation examples shown in FIGS. 3A and 3B show examples in which the strut 6 is formed by coupling two strut elements shown in FIG. 2C, and FIG. 3A is an example in which one strut element (first strut element 6a) and the other strut element (second strut element 6b) are coupled by matching the orientations of the flat portions 10, and FIG. 3B, on the other hand, is an example in which the orientations of the flat portions 10 are made different from each other.

In the strut formation examples in FIGS. 3A and 3B, the first bent portion 8 of the first strut element 6a and the first bent portion 8 of the second strut element 6b are coupled by a method such as welding, screwing or the like. When the first bent portions 8 are coupled with each other by welding, appropriate locations can be selected and welded such as a boundary portion between the flat portion 10 and the first bent portion 8 or a boundary portion between the first bent portion 8 and the second bent portion 9.

Also in the strut formation examples in FIGS. 3A and 3B, the strut 6 is formed by coupling two strut elements shown in FIG. 2C, but instead of the strut elements shown in FIG. 2C, the strut 6 may be formed by coupling two strut elements shown in FIG. 2A or 2B. Also, the strut 6 may be formed by coupling a strut element shown in one of FIGS. 2A to 2C and a strut element shown in one of the remaining figures.

Further, in the strut formation examples in FIGS. 3A and 3B, the strut 6 is formed by coupling two strut elements (the first strut element 6a and the second strut element 6b), but the number of strut elements to be coupled is not limited to two and the strut 6 may be formed by coupling three or more strut elements.

Further, in the examples in FIGS. 1, 3A, and 3B, the struts 6 configured by coupling the first strut element 6a and the second strut element 6b are arranged such that the flat portions 10 of the first strut element 6a and the second strut element 6b are arranged in a left and right direction when viewed from the front, but the orientation of arrangement of the struts 6 is not limited to the above direction and the struts may be arranged in line in a depth direction.

The strut 6 formed by coupling the first strut element 6a and the second strut element 6b is arranged, as shown in FIG. 1, on the mold clamping apparatus 1 side as an element of the machine base 3. In general, the vibration tends to be larger on the mold clamping apparatus 1 side than on the injection apparatus 2 side in the mechanism units of an injection molding machine and thus, more effect can be achieved by arranging the struts 6 formed by coupling two strut elements as shown in FIGS. 3A and 3B or more as struts on the mold clamping apparatus 1 side, but the arrangement thereof is not necessarily limited to such an example and the struts 6 may be arranged as struts on the injection apparatus 2 side or on both the mold clamping apparatus 1 side and the injection apparatus 2 side.

Next, a second embodiment of the injection molding machine according to the present invention will be described with reference to FIG. 4.

The present embodiment is different from the first embodiment in that instead of the machine base lifting member 12 (FIG. 1) having a through hole, the machine base lifting member 12 is eliminated by forming a through hole 11 in one of the first strut element 6a and the second strut element 6b constituting the strut 6. Therefore, in the injection molding machine in the present embodiment, the machine base 3 can be lifted by inserting a rod-like machine base lifting member into the through hole 11 formed in a strut element constituting the strut 6. The other configuration of the injection molding machine in the present embodiment, for example, the overall configuration of the strut 6, the first strut element 6a, and the second strut element 6b is the same as in the first embodiment shown in FIGS. 2A to 3B.

Figure 4:
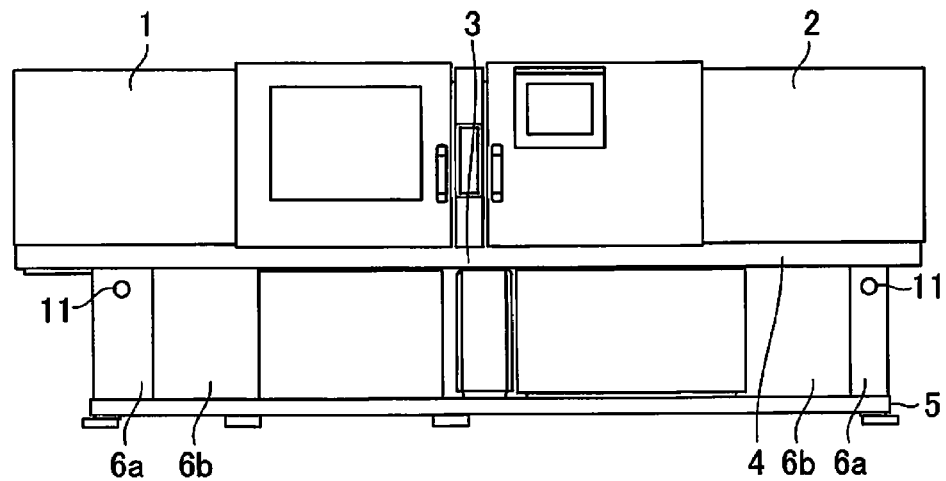
FIG. 4 is a front view showing a structure of a second embodiment of the injection molding machine according to the present invention.
Figure 5:
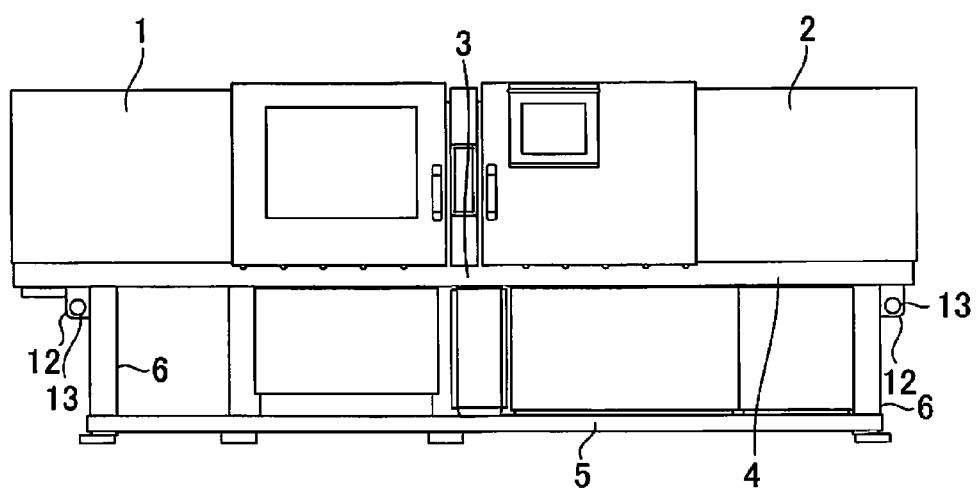
FIG. 5 is a front view showing an example of a structure of an injection molding machine according to conventional technology.

In the example in FIG. 4, the through hole 11 is provided in the first strut element 6a, but the through hole 11 may also be provided in the second strut element 6b. Though not illustrated, a through hole may also be provided in the corresponding strut 6 in the depth direction of the first strut element 6*a*. If configured as described above, a rod for machine lifting can be passed through from the front side to the back side of the machine base 3. Also in the example in FIG. 4, the through hole 11 is configured to be provided on the front side of the strut 6, but the through hole 11 may also be configured to be provided on the side face of the strut 6 so that the rod for machine lifting is passed through from the side face thereof.

The invention claimed is:

1. An injection molding machine comprising:
   a mold clamping mechanism configured to generate a mold clamping force by opening and closing a mold;
   an injection mechanism arranged opposite to the mold clamping mechanism and configured to melt and inject a resin into the mold; and
   a machine base on which the mold clamping mechanism and the injection mechanism are mounted, wherein
   the machine base includes a plurality of struts, and
   at least one of the struts is constituted by arranging and coupling a plurality of members formed in an approximately C shape in plane view.

2. The injection molding machine according to claim 1, wherein the struts are arranged on a side of the mold clamping mechanism.

3. The injection molding machine according to claim 1, wherein a through hole is provided in at least one of the members constituting the strut and formed in the approximately C shape.

* * * * *